United States Patent
Aso et al.

(10) Patent No.: US 8,396,027 B2
(45) Date of Patent: Mar. 12, 2013

(54) COMMUNICATION CONTROL SYSTEM, COMMUNICATION SYSTEM AND COMMUNICATION CONTROL METHOD

(75) Inventors: Masato Aso, Yokosuka (JP); Kenichi Katayama, Fujisawa (JP); Itsuma Tanaka, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 120 days.

(21) Appl. No.: 13/058,660

(22) PCT Filed: Jun. 26, 2009

(86) PCT No.: PCT/JP2009/061759
§ 371 (c)(1),
(2), (4) Date: Apr. 28, 2011

(87) PCT Pub. No.: WO2010/018713
PCT Pub. Date: Feb. 18, 2010

(65) Prior Publication Data
US 2011/0194494 A1 Aug. 11, 2011

(30) Foreign Application Priority Data
Aug. 12, 2008 (JP) ................ P2008-208131

(51) Int. Cl.
*H04W 4/00* (2009.01)
(52) U.S. Cl. .................. 370/328; 455/422.1
(58) Field of Classification Search .......... None
See application file for complete search history.

(56) References Cited

U.S. PATENT DOCUMENTS
2004/0066769 A1   4/2004   Ahmavaara et al.
(Continued)

FOREIGN PATENT DOCUMENTS
JP   2006 94041   4/2006
WO   2004 034720   4/2004
(Continued)

OTHER PUBLICATIONS
"Service Requirements for Home NodeB (HNB) and Home eNode B (HeNB)—Version 1.0.1", 3GPP TS22.220, Total pp. 2 (Dec. 19, 2008).
(Continued)

*Primary Examiner* — Clemence Han
(74) *Attorney, Agent, or Firm* — Oblon, Spivak, McClelland, Maier & Neustadt, L.L.P.

(57) ABSTRACT

When communication is performed on communication equipment that is connected to a communication control system to which a mobile communication terminal is connected, and is included in a private network, the communication is performed with reduced traffic. A communication control system 2 includes: a communication request transfer portion 21, which can connect to a mobile communication network N1 and a private network N2, and transfers a communication path creation request transmitted from a mobile communication terminal 10 to create a communication path specifying a device to become a transfer destination included in the mobile communication network N1; an information transmission request reception portion 22, which receives from the mobile communication terminal 10 an information transmission request, including an address of a transmission destination included in the private network N2 and transfer destination designation information designating a transfer destination included in the mobile communication network N1; a transfer destination changing portion 23, which changes the transfer destination designation information to the device to become the transfer destination included in the private network N2; and an information transmission request transmission portion 26, which transmits the information transmission request to the changed transfer destination.

16 Claims, 9 Drawing Sheets

U.S. PATENT DOCUMENTS

| | | | |
|---|---|---|---|
| 2007/0165559 A1* | 7/2007 | Seguchi et al. | 370/328 |
| 2008/0062917 A1* | 3/2008 | Oguchi | 370/328 |
| 2008/0102794 A1 | 5/2008 | Keevill et al. | |
| 2009/0201848 A1* | 8/2009 | Kumazawa et al. | 370/328 |
| 2009/0201852 A1* | 8/2009 | Chen | 370/328 |
| 2009/0268664 A1* | 10/2009 | Hirano et al. | 370/328 |
| 2010/0061296 A1* | 3/2010 | Aso et al. | 370/328 |
| 2010/0172294 A1* | 7/2010 | Toyokawa | 370/328 |

FOREIGN PATENT DOCUMENTS

| | | |
|---|---|---|
| WO | 2007 015075 | 2/2007 |

OTHER PUBLICATIONS

"Local IP Access Baseline for EHNB", 3GPP TSG SA WG2 Meeting # 71, QUALCOMM Europe, pp. 1-4 (Feb. 16, 2009).

International Search Report Issued Oct. 6, 2009 in PCT/JP09/061759 filed Jun. 26, 2009.

International Preliminary Report on Patentability and Written Opinion issued on Mar. 17, 2011 in corresponding International Application No. PCT/JP2009/061759 filed on Jun. 26, 2009.

Notice of Reasons for Rejection issued Oct. 2, 2012, in Japanese Patent Application No. P2010-524683 (with English translation).

* cited by examiner

*Fig.3*

| POOL ADDRESS | ALLOCATED USER ADDRESS |
|---|---|
| 192.0.1.1 | 10.1.1.1 |
| 192.0.1.2 | VOID |
| 192.0.1.3 | 10.19.1.1 |
| 192.0.1.4 | VOID |

*Fig.4*

| Request-URI | TRANSFER DESTINATION ADDRESS |
|---|---|
| http://www.hgw.ne.jp/home1/ | 192.0.0.1 |
| http://www.hgw.ne.jp/home2/ | 192.0.0.1 |
| http://www.hgw.ne.jp/kaden_x/ | 192.0.10.1 |
| http://www.hgw.ne.jp/kaden_y/ | 192.0.20.1 |

# COMMUNICATION CONTROL SYSTEM, COMMUNICATION SYSTEM AND COMMUNICATION CONTROL METHOD

BACKGROUND OF THE INVENTION

1. Field of the Invention

This invention relates to a communication control system, a communication system, and a communication control method.

2. Related Background Art

In communication by mobile communication terminals via a mobile communication network, a mobile communication terminal designates an APN (Access Point Name) to issue a request to a base station for connection with a specific communication destination. This connection request is sent from the base station, via a wireless control device (RNC: Radio Network Controller) included in the mobile communication network, to a packet exchange device (SGSN: Serving GPRS Support Node, GGSN: Gateway GPRS Support Node). And, in the packet exchange device, by referencing an APN included in the connection request, a gateway included in the mobile unit network used when connecting to the APN is selected, and routing to the gateway is performed. By this means, a mobile communication terminal can communicate with other communication equipment connected to the mobile communication network by transmitting information along a route to a gateway selected in the packet exchange device.

On the other hand, in recent years there have been increases in equipment which is connected to networks (private networks) different from mobile communication networks, comprising a wireless LAN or similar constructed within a home or building by preparation of a communication environment. Hence various methods have been studied for cases in which a mobile communication terminal, which connects to a mobile communication network (portable telephone network) and performs communication, connects to equipment connecting to a private network. For example, in Patent Literature 1, technology is described in which a mobile communication terminal communicates with equipment connected to a private network via a portable telephone network.

CITATION LIST

Patent Literature

Patent Literature 1: Japanese Patent Application Laid-open No. 2006-94041

SUMMARY OF THE INVENTION

Technical Problem

Among base stations to which mobile communication terminals connect to perform communication via a mobile communication network, conventionally base stations installed outdoors and having a telephone service area of radius several hundred meters to over ten kilometers have predominated; but with the goal of securing radio wave strength in locations where radio wave strength is weak and telephony is difficult, such as in regions on the border between adjacent telephone service areas and deep within buildings, compact base station devices having small telephone service areas, such as within homes and within buildings, are being installed. In recent years, communication control systems, comprising compact base station devices to enable communication by mobile communication terminals via mobile communication networks and routers connecting the above-described private networks and mobile communication networks, have come to be provided within user homes. And, when performing communication by mobile communication terminals within user homes, methods have come to be used in which a mobile communication terminal is connected to a communication control system within a user home, and from here a connection is made with a wireless control device within the mobile communication network.

However, when a mobile communication terminal performs communication, as explained above, information must be transmitted and received through a gateway selected in a packet exchange device. And, the gateway selected by the packet exchange device is included in the mobile communication network. Hence even when the destination of information transmission by the mobile communication terminal is communication equipment (a server) included in a private network which can be connected to the communication control system to which the mobile communication terminal is connected, at the start of communication, information must be transmitted along a route via the gateway included in the mobile communication network selected by the packet exchange device, and so there has been the problem that traffic increases.

This invention was devised in light of the above, and has as an object the provision of a communication control system, communication system, and communication control method, in which a mobile communication terminal is connected to a communication control system comprising a compact base station device to which the mobile communication terminal is connected and a router, and in which, when performing communication with communication equipment (a server) included in a private network, communication with reduced traffic is possible.

Solution to Problem

In order to attain the above object, a communication control system of this invention can be connected to a plurality of networks including a mobile communication network, and performs communication between the mobile communication network and a mobile communication terminal via the communication control system, and the communication control system includes: communication path creation request transfer means for transferring a communication path creation request transmitted from the mobile communication terminal to create a communication path specifying a device to become a transfer destination between the mobile communication terminal and the mobile communication network; information transmission request reception means for receiving, from the mobile communication terminal for which the communication path has been created by transferring the communication path creation request by the communication path creation request transfer means, an information transmission request, including an address of a transmission destination included in a network different from the mobile communication network and transfer destination designation information designating as the transfer destination the device to become the transfer destination; transfer destination changing means for changing the transfer destination, designated by transfer destination designation information included in the information transmission request received by the transmission request reception step, to the device to become the transfer destination included in the different network; and information transmission request transmission means for transmitting the information transmission request to the transfer destination changed by the transfer destination changing means.

In the above communication control system, a communication path creation request, transmitted from a mobile communication terminal, to create a communication path specifying a device to become a transfer destination with the mobile communication network, is transferred. And, an information transmission request transmitted from the mobile communication terminal for which the communication path was created is received. Here, in the above communication control system, when the transfer destination included in the information transmission request is included in a network different from the mobile communication network, in the transfer destination changing means the transfer destination designation information is changed to a device to become the transfer destination included in a different network. And, transmission is performed from the communication control system to the transfer destination according to the changed transfer destination designation information. Hence this information transmission request is not transferred to the designated device which was to be the transfer destination included in the mobile communication network in the communication path created in advance, but is transmitted to the transmission destination via a device to become the transfer destination included in a different network. In this way, an information transmission request can be transmitted to a device included in a network different from the mobile communication network to which the communication control system can connect without passing through a communication path formed within the mobile communication network, so that communication can be performed with less traffic.

Here, a communication control system of this invention may assume a mode further including transfer destination information storage means for storing information associating an address of communication equipment included in a network different from the mobile communication network to which the communication control system can connect and the device to become the transfer destination when connection is made to the communication equipment from the communication control system via the network different from the mobile communication network; and in which the transfer destination changing means references the address of the transmission destination received by the information transmission request reception means, and, when the address coincides with the address of the communication equipment included in the network different from the mobile communication network, stored by the transfer destination information storage means, changes the transfer destination, designated by the transfer destination designation information included in the transmission request received in the transmission request reception step, to the device to become the transfer destination included in the different network.

By employing a mode, as in the above communication control system, in which information is stored in advance in the transfer destination information storage means which associates an address of communication equipment included in a network different from the mobile communication network with which the communication control system can connect, and a device to become the transfer destination when connecting with the communication equipment via a different network, reduction of traffic through changing of the transfer destination designation information by the transfer destination changing means can be reliably executed.

Further, transfer destination changing means of the communication control system may assume a mode in which the transfer destination, designated by the transfer destination designation information included in the information transmission request transmitted from the mobile communication terminal via a communication path, created based on the communication path creation request transmitted from the mobile communication terminal and designating a specific device as the transfer destination, and received by the information transmission request reception means, is changed to the device to become the transfer destination included the different network.

When in this way a transfer destination designated in an information transmission request transmitted from the mobile communication terminal via a communication path designating a specific device as the transfer destination is changed to a device to become the transfer destination included in a different network, the transfer destination can be changed uniformly in the information transmission request transmitted via the communication path without referencing information stated in the information transmission request. Hence traffic reduction can be reliably realized through minimal processing.

Further, the transfer destination changing means may assume a mode in which, when the transfer destination designated by the transfer destination designation information included in the information transmission request received by the information transmission request reception means is a specific device, the transfer destination designated by the transfer destination designation information included in the information transmission request received by the information transmission request reception means is changed to the device to become the transfer destination included in the different network.

In this case, even when, for an information transmission request including transfer destination designation information which designates a specific device, a plurality of communication paths are provided for which the transfer destination between the mobile communication terminal and the communication control system is different in order for the transfer destination designation information to change the device to become the transfer destination included in a different network, by referencing the transfer destination designation information included in the information transmission request, the necessity of transfer destination changing can be judged, and communication can be performed with reduced traffic.

Further, a mode may be employed which further includes terminal specification information storage means for associating information specifying the mobile communication terminal and an address specifying the mobile communication terminal in communication via the network different from the mobile communication network to which the communication control system can connect, and storing the information and the address, which are associated with each other, in which the transfer destination changing means references the terminal specification information storage means, and changes the information specifying the mobile communication terminal which has transmitted the information transmission request, included in the information transmission request, to the address specifying the mobile communication terminal in communication via the network different from the mobile communication network to which the communication control system can connect.

In order to transmit an information transmission request transmitted from a mobile communication terminal to the transmission destination included in a network different from the mobile communication network, changing of information indicating the sender as well to information corresponding to the different network is necessary. In the above communication control system, information is stored in advance in the terminal specification information storage means which associates information specifying the mobile communication terminal and an address used in communication via a different network; when changing transfer destination designation information in the transfer destination changing means to a device to become the transfer destination in connection via a different network, information for the mobile communication terminal specifying the sender is also changed to an address specifying the mobile communication terminal in connection via a different network. Hence processing is performed in the communication control system to transmit information to the sender included in a different network, so that processing to perform communication with less traffic is performed more efficiently.

Here, as a configuration to effectively realize the above action, a specific mode may be cited in which information designating a specific APN is included in a communication path creation request. Further, as another configuration to effectively realize the above action, a specific mode may be cited in which a communication path creation request is a PDP context startup request.

Further, a communication system of this invention comprises the above communication control system and a communication path creation device provided within a mobile communication network, and can assume a mode in which the communication path creation device includes communication path creation means for receiving the communication path creation request transferred from the communication path creation request transfer means, and based on the communication path creation request, creating the communication path specifying the device to become the transfer destination between the mobile communication terminal and the mobile communication network, and the communication path creation request transfer means transmits the communication path creation request transferred from the mobile communication terminal to the communication path creation device, and the communication path creation means creates the communication path in which the specific device serves as the device to become the transfer destination, based on the communication path creation request transmitted from the communication path creation request transfer means.

By, as in the above communication system, comprising a communication path creation device which creates in advance a specific communication path used in connection via a different network, according to a communication path creation request transmitted from a mobile communication terminal, communication control is performed more appropriately by a communication control system which, for the above information transmission request including transfer destination designation information designating a specific device, changes the transfer destination designation information to a device to become the transfer destination included in a different network.

Here, a mode may be assumed in which the communication path creation request transfer means transmits, to the communication path creation device, the communication path creation request transmitted from the mobile communication terminal, and the information specifying the communication control system to the communication path creation device, and the communication path creation means creates the communication path in which the specific device serves as the transfer destination based on the communication path creation request transmitted from the communication path creation request transfer means and the information specifying the communication control system.

By employing a mode, as in the above, in which a communication path is created designating a specific device as the device to become the transfer destination based on information specifying the communication control system to which the mobile communication terminal connects, for example communication paths which differ depending on the communication control system to which the mobile communication terminal connects can be created, and traffic can be reduced appropriately according to the environment of connection of the mobile communication terminal and the communication control system.

Here, as a configuration to effectively realize the above action, a specific mode may be cited in which the communication path creation device is configured including a SGSN.

A communication control system of this invention can also be described as an invention of a communication control method, as presented below. Only the category is different, and the invention is effectively the same, with similar action and effects exhibited.

That is, a communication control method of this invention is a communication control method, performed by a communication control system which can connect to a plurality of networks including a mobile communication network, and performs communication between the mobile communication network and a mobile communication terminal via the communication control system, and the communication control method including: a communication path creation request transfer step of transferring a communication path creation request transmitted from the mobile communication terminal to create a communication path specifying a device to become a transfer destination between the mobile communication terminal and the mobile communication network; an information transmission request reception step of receiving, from the mobile communication terminal for which the communication path has been created by transferring the communication path creation request in the communication path creation request transfer step, an information transmission request, including an address of a transmission destination included in a network different from the mobile communication network and transfer destination designation information designating as the transfer destination the device to become the transfer destination; a transfer destination changing step of changing the transfer destination, designated in the transfer destination designation information included in the information transmission request received in the information transmission request reception step, to the device to become the transfer destination included in the different network; and an information transmission request transmission step of transmitting the information transmission request to the changed transfer destination in the passthrough changing step.

Advantageous Effects of Invention

Here, as a configuration to effectively realize the above action, a specific mode may be cited in which the communication path creation request includes information designating a specific APN. Further, as a configuration to effectively realize the above action, a specific mode may be cited in which the communication path creation request is a PDP context startup request.

By means of this invention, a communication control system, communication system, and communication control method are provided in which, when communication equipment (a server) included in a private network is connected to the communication control system comprising a compact base station device and router and connected to a mobile communication terminal, communication can be performed with reduced traffic.

BRIEF DESCRIPTION OF THE DRAWINGS

FIG. 3 is a table showing the association of pool addresses and mobile communication terminal addresses held in a base station device;

FIG. 4 is a table showing the association of Request-URI and the devices to become transfer destinations when connecting via a private network with the devices specified by the Request-URI, held in the base station device;

DESCRIPTION OF THE PREFERRED EMBODIMENTS

Below, preferred embodiments of the invention are explained in detail together with the drawings. In explanations of the drawings, the same symbols are assigned to the same elements, and redundant explanations are omitted.

(First Embodiment)

Figure 1:
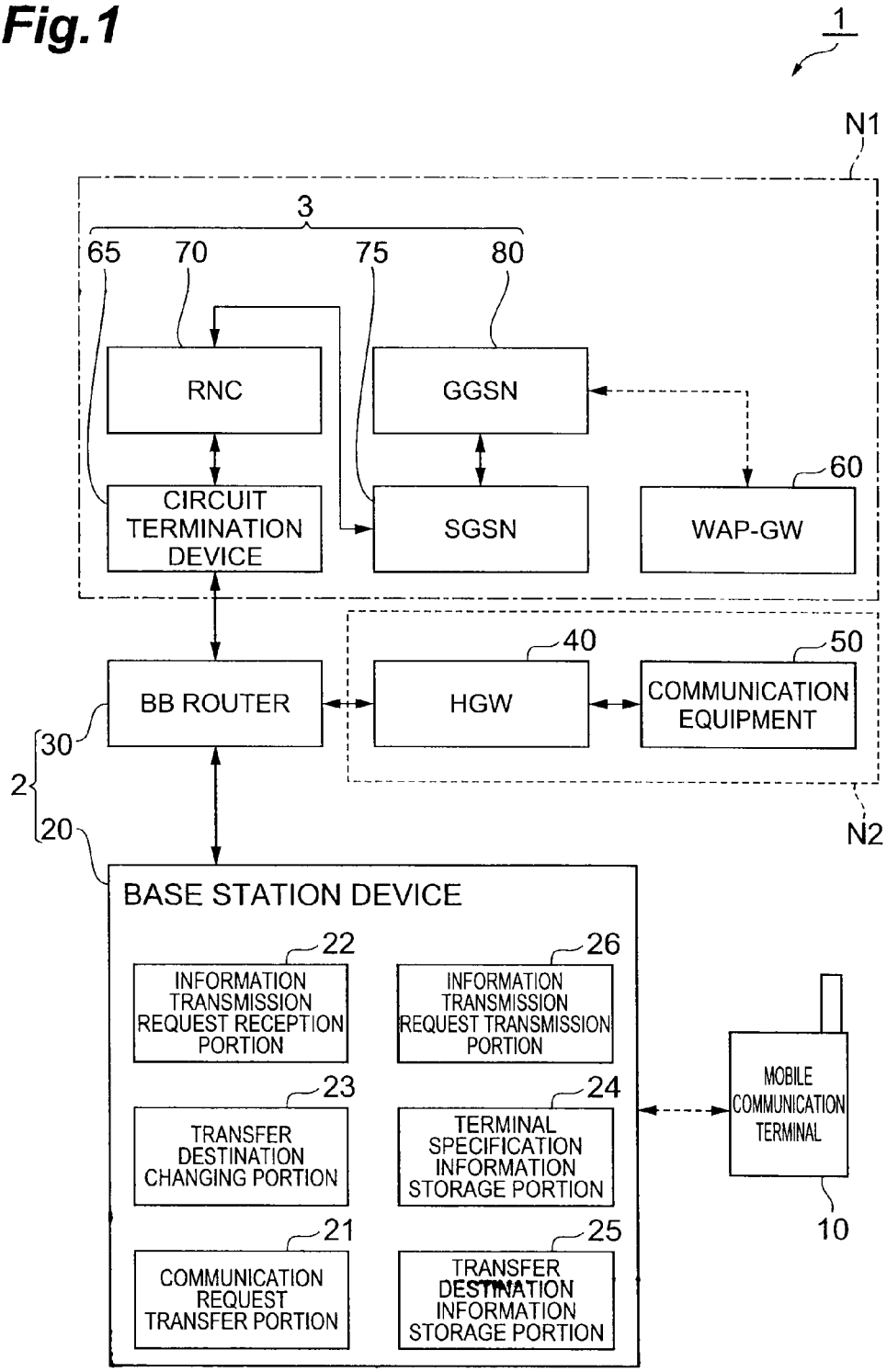
FIG. 1 is a block diagram showing the configuration of the communication system of a preferred embodiment of the invention.

FIG. 1 shows the configuration of the communication system 1 of a first embodiment of the invention, and connection relations therein.

The communication system 1 of this embodiment comprises a communication control system 2 and terminal connection system 3. The communication control system 2 comprises a base station device (Home Node B) 20 and BB (Broad Band) router 30, and has a function enabling connection to the mobile communication network N1 and private network N2. The terminal connection system 3 is included in the mobile communication network N1, and comprises the circuit terminating device 65, RNC 70, SGSN 75, and GGSN 80.

The communication control system 2 is a system which intermediates communication between the mobile communication terminal 10 and the mobile communication network N1. Further, the communication control system 2 can connect to a private network N2 different from the mobile communication network N1. The communication control system 2 is further connected to a HGW (Home Gateway) 40, included in the private network N2, and connected to the communication equipment 50. As the communication equipment 50, for example a home appliance or similar may be cited, having functions for performing actions according to instructions from users, and functions for supplying information according to user instructions, and similar. The communication equipment 50 may have functions for connecting to a network different from the private network N2.

On the other hand, the terminal connection system 3 is a system which functions as a communication path creation device to create a communication path when the mobile communication terminal 10 connects with the mobile communication network N1 via the communication control system 2 and performs communication. Further, the terminal connection system 3 can connect to a WAP-GW (Wireless Application Protocol-Gateway) 60 included in the mobile communication network N1. This WAP-GW 60 has a function for connecting the mobile communication network N1 and an external network, and is a device which is passed through when the mobile communication terminal 10 connects to the mobile communication network N1 and connects with equipment included in the external network. In place of the WAP-GW, a device having a function for connection to another external network can be used.

A mobile communication network N1 to which the communication control system 2 can connect is for example a network to perform packet communication by mobile communication terminals 10 covering a wide-ranging area. Further, a private network N2 to which the communication control system 2 can connect is for example a network including household equipment within a user's home (for example, communication equipment 50) provided within the user's home, or similar. Here, it is assumed that a private network N2 to which the communication control system 2 of this embodiment can connect is a network constructed within a user's home. In this case, the communication control system 2 configured by the base station device 20 and BB router 30 is provided within the user's home. And, when in the user's home the user operates a mobile communication terminal 10 located in the area of the base station device 20, and by connecting to the mobile communication network N1, transmits information to the communication equipment 50 included in the private network N2 (for example, issuing an instruction for some kind of operation to the communication equipment 50), processing for communication control in an embodiment described below is performed.

Information is exchanged between the mobile communication terminal 10 and the base station device 20 by wireless communication.

Further, the base station device 20 and BB router 30, the BB router 30 and HGW 40, the HGW 40 and communication equipment 50, the BB router 30 and circuit terminating device 65, the circuit terminating device 65 and RNC 70, the RNC 70 and SGSN 75, the SGSN 75 and GGSN 80, and the GGSN 80 and WAP-GW 60, are each connected via a wire network. The base station device 20 and BB router 30, the BB router 30 and HGW 40, and the HGW 40 and communication equipment 50, may be connected by a wireless network as well.

Next, functions of each of the devices included in the communication system 1 are explained.

The mobile communication terminal 10 is a device used by a user to connect to the mobile communication network N1 to perform mobile unit communication, and is specifically realized as for example a portable telephone set, PDA, or other device having communication functions.

Here, processing performed when the mobile communication terminal 10 is connected to the mobile communication network N1 and performs communication is explained. When the mobile communication terminal 10 connects to the mobile communication network N1 and performs communication, first a communication path creation request specifying an APN (Access Point Name) is transmitted from the mobile communication terminal 10 to the base station device 20, in order to create a communication path specifying a device to become the transfer destination. Here, the APN specified by the mobile communication terminal 10 is a character string identifying the network, provider, and similar when performing specific packet communication to connect by the packet communication. For example, suppose that the communication equipment 50 can connect to the Internet, and that by using a service supplied by a specific ISP (Internet Service Provider) connected to an mobile communication network N1, the mobile communication terminal 10 can communicate with the communication equipment 50. At this time, when the mobile communication terminal 10 performs communication with the communication equipment 50, the APN specified by the above ISP is transmitted from the mobile communication terminal 10. This APN is input by the user or similar, and by this means is stored in advance in the mobile communication terminal 10. Further, by connecting the mobile communication terminal 10 to the mobile communication network N1, when performing communication with equipment included in another network (for example, the communication equipment 50), normally information sent from the mobile communication terminal 10 must be transmitted to the transmission destination via the device (in this embodiment, the WAP-GW 60) connecting the mobile communication network N1 and the other network. When a mobile communication network N1 is connected with a mobile communication network N1 and communication is performed with a transmission destination included in another network, by having the mobile communication terminal 10 transmit a communication path creation request in advance, a communication path is created between the mobile communication terminal 10 and the device to become the transfer destination (WAP-GW 60).

And, after the communication path is created, an information transmission request in which the transmission destination and transfer destination (destination address) are designated is transmitted from the mobile communication terminal 10. This information transmission request includes information for the equipment of the transmission destination (the communication equipment 50) (for example, an operation instruction for the communication equipment 50). By transmitting this information transmission request via the communication path to the transmission destination, communication is performed between the mobile communication terminal 10 and the transmission destination via the mobile communication network N1. Here, in an information transmission request transmitted from the mobile communication terminal 10, the transmission destination is designated using a Request-URI. Further, as the transfer destination, information is designated specifying a device specified by the communication path created in advance. That is, processing is performed in which, when the mobile communication terminal 10 connects with the mobile communication network N1 and performs communication, first an APN is designated and a communication path creation request is transmitted, and after a communication path is created in this way, a Request-URI is used to transmit the information transmission request to the designated transmission destination via the communication path.

Once a communication path designating an APN is created, until use of the communication path is canceled (the connection to the mobile communication network N1 is canceled), the same communication path is used to perform information transmission and reception.

Figure 2:
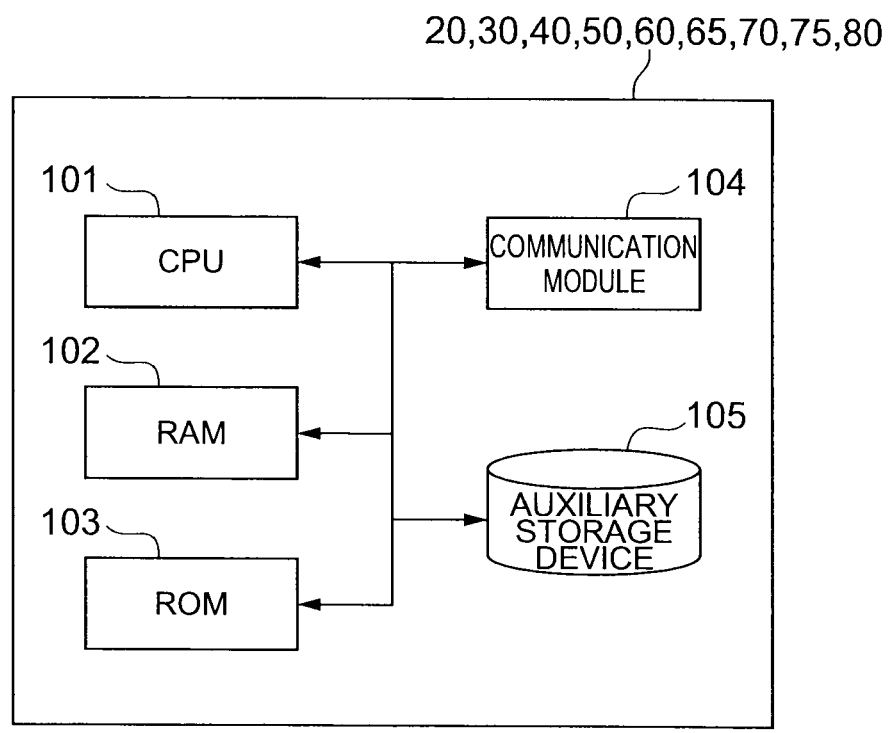
FIG. 2 shows the hardware configuration of a base station device, BB router, HGW, circuit terminating device, RNC, SGSN, and GGSN in an embodiment of the invention.

Next, the base station device 20 and BB router 30 comprised by the communication control system 2 are explained. The base station device 20 and BB router 30 are configured as a computer comprising a CPU 101, RAM 102, ROM 103, a communication module 104, an auxiliary storage device 105, and other hardware as shown in FIG. 2. Through operation of these constituent elements, the functions of this embodiment, described below, are exhibited.

First, the base station device 20 is explained. As shown in FIG. 1, the base station device 20 comprises a communication request transfer portion 21, information transmission request reception portion 22, transfer destination change portion 23, terminal specification information storage portion 24, transfer destination information storage portion 25, and information transmission request transmission portion 26.

The communication request transfer portion 21 functions as communication request transfer means for transferring a communication path creation request transmitted from the mobile communication terminal 10. A communication path creation request is transmitted from the mobile communication terminal 10 to create a communication path designating the device to become the transfer destination, for use when the mobile communication terminal 10 performs communication via a mobile communication network. This communication path creation request includes information specifying the mobile communication terminal 10, and an APN which is information designating the transmission destination. The communication request transfer portion 21 transfers this communication path creation request to the BB router 30.

The information transmission request reception portion 22 functions as information transmission request reception means for receiving, from the mobile communication terminal 10 for which the communication request transfer portion 21 has created a communication path, an information transmission request including the address of the transmission destination included in a private network N2 which is a network different from the mobile communication network N1, and transfer destination designation information designating as the transfer destination a device to become the transfer destination designated in the communication request transfer portion 21. The information transmission request reception portion 22 sends the received information transmission request to the transfer destination change portion 23.

The transfer destination change portion 23 functions as transfer destination changing means for referencing the information transmission request sent from the information transmission request reception portion 22, and for changing the transfer destination designated by the transfer destination designation information included in the information transmission request to the device to become the transfer destination included in the private network N2. Changing of the transfer destination included in the information transmission request by the transfer destination change portion 23 is performed by referencing the terminal specification information storage portion 24, described below.

The transfer destination change portion 23 also has a function to change information specifying the mobile communication terminal 10 included in the information transmission request to an address specifying the mobile communication terminal 10 in communication via the private network N2. Changing of information specifying the mobile communication terminal 10 by the transfer destination change portion 23 is performed by referencing the transfer destination information storage portion 25, described below. The information transmission request, with information specifying the transfer destination and mobile communication terminal 10 changed by the transfer destination change portion 23, is sent to the information transmission request transmission portion 26.

Information transmission requests transmitted from the mobile communication terminal 10 also include information transmission requests in which equipment not included in the private network N2 is designated as the transmission destination. In this case, the information transmission request received by the information transmission request reception portion 22 is sent to the transfer destination change portion 23, but processing for change of the transfer destination is not performed in the transfer destination change portion 23, and the information transmission request is sent to the information transmission request transmission portion 26. Processing for judgment of the necessity of changing the transfer destination designation information is described below.

The terminal specification information storage portion 24 functions as terminal specification information storage means for storing, in association, information specifying the mobile communication terminal 10 in the mobile communication network N1, and an address specifying the mobile communication terminal 10 in the private network N2. This is because information specifying the mobile communication terminal 10 used as the sender address (source address) in communication via the mobile communication network N1 cannot be used as information specifying the mobile communication terminal 10 in the private network N2. Hence in order to connect to the private network N2 and transmit information transmitted from the mobile communication terminal 10 to the transmission destination, information specifying the mobile communication terminal 10 in the private network N2 must be newly prepared.

Information stored in the terminal specification information storage portion 24 is, specifically, a table such as that shown in FIG. 3. In the terminal specification information storage portion 24, an address which can be used in the private network N2 and is not associated with a specific mobile communication terminal 10 is held as a pool address. And, by allocating to a pool address information specifying a mobile communication terminal 10 located in the area subordinate to the base station device 20, information specifying the mobile communication terminal 10 used in communication via the private network N2 is held. In FIG. 3, for example for a mobile communication terminal 10 specified by the IP address "10.1.1.1" in the mobile communication network N1, the pool address "192.0.1.1" in the private network N2 is associated. The IP address shown in FIG. 3 as information specifying the mobile communication terminal 10 in the mobile communication network N1 is information imparted by the DHCP (Dynamic Host Configuration Protocol), GGSN 80 or similar. This IP address is equivalent to the sender address used in communication control processing in the embodiment described below. Further, it is shown that a specific mobile communication terminal is not associated with the pool address "192.0.1.2". In this case, when the transmission destination of an information transmission request transmitted from the mobile communication terminal 10 specified by "10.1.1.1" is equipment (for example, communication equipment 50) included in the private network N2, the information specifying the mobile communication terminal 10 which is the transmission source of the information transmission request is changed to "192.0.1.1" by the transfer destination change portion 23.

The association of the above pool addresses with mobile communication terminals 10 subordinate to the base station device 20 is performed by the issuing of pool addresses by DHCP. Further, this processing can be performed with arbitrary timing. For example, association of a mobile communication terminal 10 and a pool address can also be performed when the mobile communication terminal 10 is located in the area subordinate to a base station device 20, and when a communication path creation request transmitted from the mobile communication terminal 10 is received. And another possibility is a case in which, after an information transmission request has been transmitted from a mobile communication terminal 10, the transmission destination designated by the information transmission request is judged to be a device connected to a private network N2, and changing of the transfer destination is performed in the transfer destination change portion 23. Further, a mode may be employed in which, once a pool address and a mobile communication terminal 10 have been associated, this relationship is maintained until the mobile communication terminal 10 is located outside the area, and a mode may be employed in which this relationship is cancelled (a void address is again assigned) when use of a communication path which has been created ends. Further, an association of a pool address and a mobile communication terminal 10 subordinate to a base station device 20 is not limited to dynamic processing by DHCP. For example, a specific pool address can be associated in advance with information (for example, an MSISDN, Mobile Subscriber ISDN Number, a telephone number) or an IMSI (International Mobile Subscriber Identity) specifying a mobile communication terminal 10, connection of which to a base station device 20 is conceivable.

The transfer destination information storage portion 25 functions as transfer destination information storage means for storing information associating the address of communication equipment included in a private network N2 different from the mobile communication network N1 with which the communication control system 2 can connect, and a device to become the transfer destination when connecting with the communication equipment from the communication control system 2 via the private network N2. Specifically, as shown in FIG. 4, a Request-URI which is information specifying a transmission destination indicated by the mobile communication terminal 10, and a transfer destination address specifying a device to become the transfer destination when connecting to the transmission destination via the private network N2, are held in association. FIG. 4 shows that, when for example connecting via the private network N2 to a transmission destination designated by the Request-URI "http://www.hgw.ne.jp/home1/", the device specified by the address "192.0.0.1" is the device to become the transfer destination.

In the transfer destination information storage portion 25, the device itself ascertains in advance the equipment included in the private network N2 (for example, the communication equipment 50), and the Request-URI when connecting with the device via the mobile communication network N1, and information specifying the device of the private network N2 to become the transfer destination when the device specified by the Request-URI is not connected via the mobile communication network N1, are associated and stored. Transfer destination information relating to equipment that cannot be connected from the communication control system 2 via the private network N2 (that is, equipment not included in the private network N2) is not held in the transfer destination information storage portion 25. Hence in the transfer destination change portion 23, by confirming whether the transmission destination (Request-URI) included in an information transmission request transmitted from a mobile communication terminal 10 is held in the transfer destination information storage portion 25, it can be judged whether the transmission destination is equipment which can be connected via the private network N2.

The information transmission request transmission portion 26 functions as information transmission request transmission means for transmitting an information transmission request sent from the transfer destination change portion 23, to the transfer destination changed by the transfer destination change portion 23. Because the transmission destination indicated by the mobile communication terminal 10 is not included in the private network N2, even in cases in which transfer destination changing is not performed by the transfer destination change portion 23, the information transmission request transmission portion 26 has the function of transferring an information transmission request to the transfer destination indicated in the information transmission request.

Next, the BB router 30 is explained. The BB router 30 has the functions of receiving an information transmission request transmitted from the base station device 20, deciding the transmission path from the transfer destination included in the information transmission request, and as described below, transmitting the information transmission request to one among the HGW 40 included in the private network N2 and the circuit terminating device 65 included in the mobile communication network N1.

Next, the HGW 40 and communication equipment 50 included in the private network N2 are explained.

The HGW (Home GateWay) 40 is a device which connects a mobile communication network N1 or other external network and a private network N2. The HGW 40 is connected to the BB router 30, and is also connected to equipment (the communication equipment 50) included in the private network N2.

The communication equipment 50 is equipment (a service server) connected to the HGW 40. As explained above, the communication equipment 50 may be appliance equipment or similar having a network connection function.

Next, the circuit terminating device 65, RNC 70, SGSN 75, and GGSN 80 comprised by the terminal connection system 3 are explained. As shown in FIG. 2, the circuit terminating device 65, RNC 70, SGSN 75, and GGSN 80 are configured as a computer comprising a CPU 101, RAM 102, ROM 103, communication module 104, auxiliary storage device 105, and other hardware. Through operation of these constituent elements, functions of the embodiment described below are exhibited.

The line terminal device 65 is a device which has functions for connecting lines in the user's home connecting the base station device 20, BB router 30, HGW 40, and communication equipment 50 with the mobile communication network N1, and, by converting signals between the different lines (terminates the IPsec (Security Architecture for Internet Protocol)), for connecting lines in the user's home with the mobile communication network N1.

The RNC 70 is a device, connected to a plurality of base stations, which makes settings for wireless circuits from each base station to the mobile communication terminal 10 and performs handover control between base stations and similar. However, in this embodiment an example is explained in which a single base station device 20 is connected. The RNC 70 may be connected to the base station device 20 via the line terminal device 65 and BB router 30, as in this embodiment.

The SGSN 75 is a device provided in the mobile communication network N1 which records positions and similar and manages access and similar of mobile communication terminals 10 located in the area of the mobile communication network N1, and for example holds the MSISDNs and similar of mobile communication terminals 10. The GGSN 80 is a device which performs control of packet communication in the mobile communication network N1. Specifically, the GGSN 80 has a function for transmitting to devices to become transfer destinations the information transmission requests of mobile communication terminals 10 transmitted from the SGSN 75.

The WAP-GW 60 is a device which connects the mobile communication network Ni to other networks. When an mobile communication terminal 10 performs communication with equipment (for example, communication equipment 50) included in another network by connecting to the mobile communication network N1, this device is designated as the transfer destination when connecting with the communication equipment 50 via the mobile communication network N1.

Through the functions of the above-described circuit terminating device 65, RNC 70, SGSN 75, and GGSN 80, a communication path with the WAP-GW 60 as transfer destination is created based on a communication path creation request transmitted from the mobile communication terminal 10 via the base station device 20 and BB router 30. The specific processing is described below.

Figure 5:
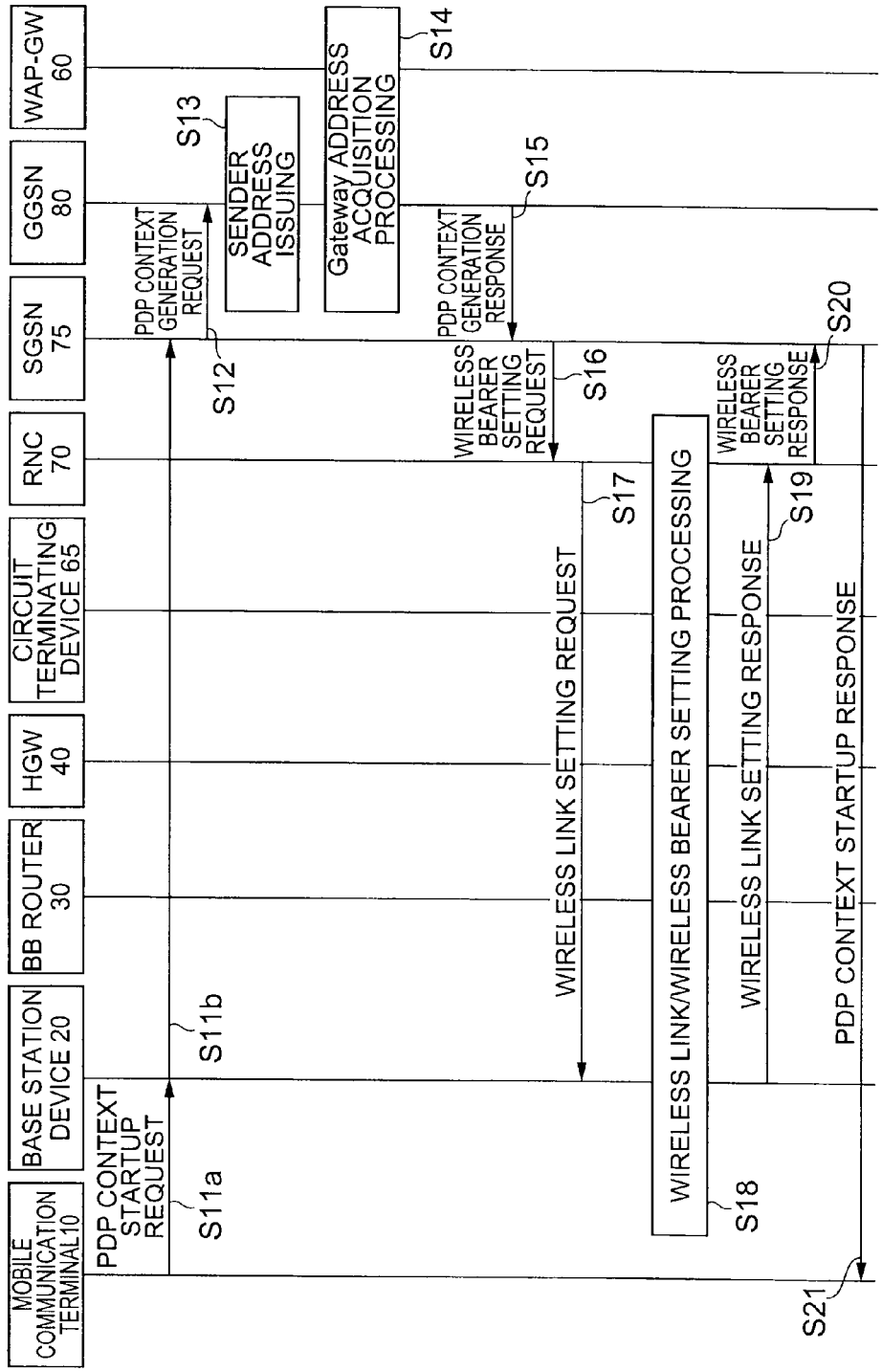
FIG. 5 explains the processing, in the communication control method of a first embodiment of the invention, up to establishment of a communication path so that a mobile communication terminal 10 performs perform packet communication.
Figure 6:
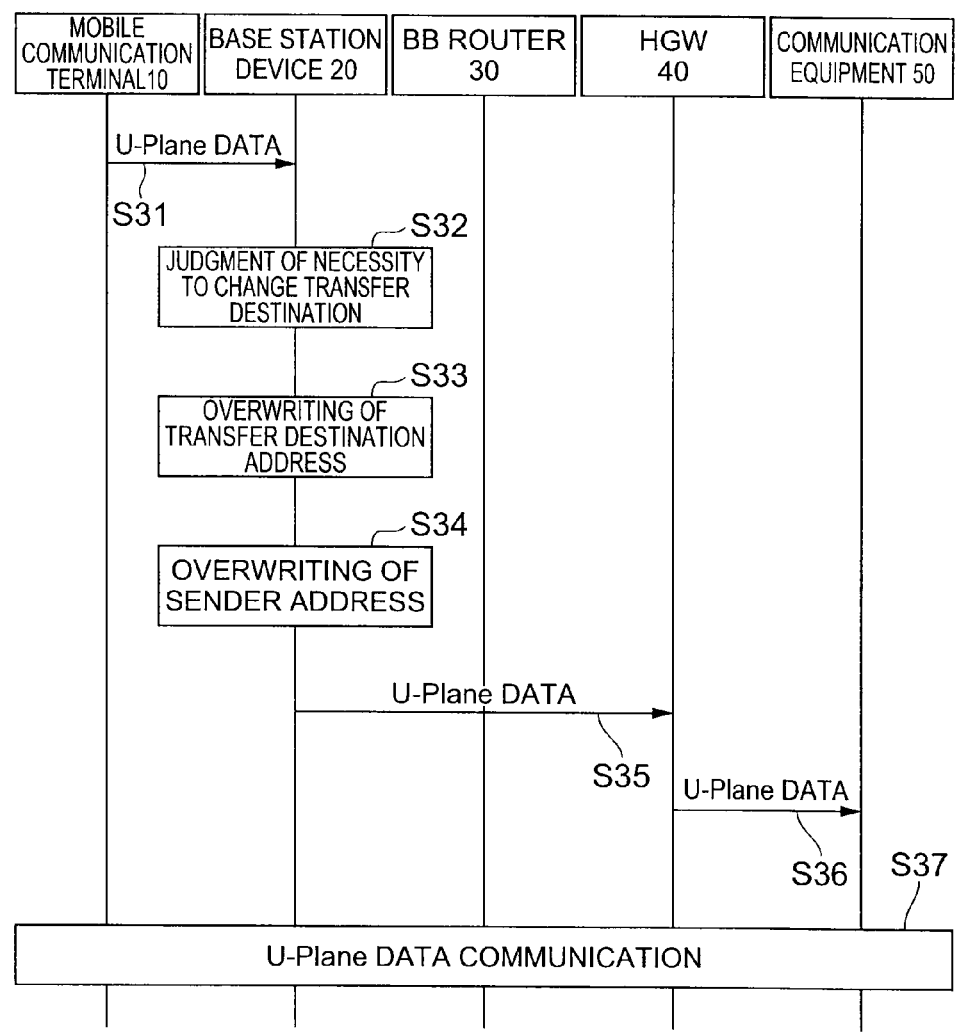
FIG. 6 explains the processing, in the communication control method of the first embodiment of the invention, up to transmission to communication equipment of an information transmission request transmitted from the mobile communication terminal 10.

Next, the method of communication control by the mobile communication system 1 of this embodiment is explained using the sequence diagrams of FIG. 5 and FIG. 6. The processing for communication control explained below starts upon the occasion of operation of a mobile communication terminal 10 by a user manipulating the mobile communication terminal 10, for example, to connect to the mobile communication network N1 and perform communication.

First, in FIG. 5, processing is explained when a communication path is created to connect a mobile communication terminal 10 to the mobile communication network N1 and perform communication based on a communication path creation request transmitted from the mobile communication terminal 10. Here, in relation to creation of a communication path, information transmitted from the mobile communication terminal 10 to the terminal connection system 3 is information used only in communication path creation, and is called C-Plane data.

First, a PDP (Packet Data Protocol) context startup request is transmitted from the mobile communication terminal 10 to the SGSN 75 comprised by the terminal connection system 3. A PDP context startup request is equivalent to a communication path creation request, and requests of the terminal connection system 3 the creation of a communication path to perform packet communication via the mobile communication network N1. A PDP context startup request includes information (for example, P-TMSI (Packet-Temporary Mobile Subscriber Identity) or IMSI) specifying the mobile communication terminal 10 which is the sender, and an APN specifying the provider or similar which is connected when performing packet communication. A PDP context startup request transmitted from the mobile communication terminal 10 is transferred to the communication request transfer portion 21 of the base station device 20 (S11a: communication path creation request transfer step), and is transmitted to the SGSN75 (S11b).

In the SGSN 75, based on the PDP context startup request transmitted from the communication request transfer portion 21 of the base station device 20, a PDP context generation request including the MSISDN of the mobile communication terminal 10 and information specifying the SGSN 75 (address of the SGSN 75) is transmitted to the GGSN 80 (S12).

In the GGSN 80, based on the PDP context generation request transmitted by the SGSN 75, issuing of the sender address imparted to the mobile communication terminal 10 is performed (S13). Here, the sender address issued by the GGSN 80 is equivalent to the user address shown in FIG. 3. Also, the device to become the transfer destination is selected based on the APN. In this embodiment, the WAP-GW 60 is selected as the device to become the transfer destination, and gateway address acquisition processing is performed between the GGSN 80 and the WAP-GW 60 (S14). This is processing to create and address for use when spacing the WAP-GW 60 as the transfer destination when the mobile communication terminal 10 transmits an information transmission request. Through the above processing, the GGSN 80 notifies the SGSN 75 that a PDP context has been generated (S15). The SGSN 75, upon receiving the PDP context generation response, issues a wireless bearer setting request to the RNC 70 (S16). This is an instruction to perform communication between the mobile communication terminal 10 and the RNC 70 via a specific communication path.

Based on the wireless bearer setting request transmitted from the SGSN 75, the RNC 70 issues a wireless link setting request to the base station device 20 (S17). The base station device 20 performs communication between the BB router 30, HGW 40, circuit terminating device 65 and RNC 70 according to this wireless link setting request, and by this means performs wireless link and wireless bearer setting processing (S18). Thereafter, the base station device 20 notifies the RNC 70, as a wireless link setting response, that settings have been made to connect the mobile communication terminal 10 via the base station device 20 to the mobile communication network N1 (S19). Based on the wireless link setting response of the notification from the base station device 20, the RNC 70 issues a wireless bearer setting response to the SGSN 75, and issues notification that processing for packet communication has been performed (S20). The SGSN 75 notifies the mobile communication terminal 10, as a PDP context startup response, that, through the above processing, communication path creation processing (PDP context startup) for the mobile communication terminal 10 has been completed (S21). At this time, the mobile communication terminal 10 is notified of information for the WAP-GW 60 as the sender address used when performing packet communication and the specific transfer destination (gateway). Through the above series of processing, a communication path is created, setting the WAP-GW 60 as the transfer destination, to be used when the mobile communication terminal 10 performs communication via the mobile communication network N1. The communication path created in the above processing has a route which passes through all the devices which performed processing in the above communication path creation (the base station device 20, BB router 30, circuit terminating device 65, RNC 70, SGSN 75, and GGSN 80) and arrives at the WAP-GW 60.

Next, FIG. 6 is used to explain processing when performing communication via the communication path created by the processing shown in FIG. 5. Communication via the communication path, shown in FIG. 6, is performed each time packet data is transmitted from the mobile communication terminal 10 designating the equipment to become the transmission destination.

The mobile communication terminal 10 transmits U-Plane data to the base station device 20 (S31). This U-Plane data is equivalent to an information transmission request, transmitted from the mobile communication terminal 10 to a specific transmission destination (in this embodiment, the communication equipment 50). This U-Plane data includes information specifying the mobile communication terminal 10, information indicating the transmission destination, and transfer destination designation information. As information specifying the mobile communication terminal 10, the address for the sender, notified in the processing for communication path creation of FIG. 5, is used. As information indicating the transmission destination, the Request-URI associated with the communication equipment 50 is used. And, as the transfer destination designation information, the address of the WAP-GW 60 notified in the processing for communication path creation of FIG. 5 is used.

In the information transmission request reception portion 22 of the base station device 20, U-Plane data transmitted from the mobile communication terminal 10 is received (information transmission request reception step), and is sent to the transfer destination designation information change portion 23. In the transfer destination designation information change portion 23, the Request-URI which is information indicating the transmission destination included in the U-Plane data sent from the information transmission request reception portion 22 is referenced, and a judgment as to whether transfer destination changing is necessary is made (S32). As explained above, the necessity of transfer destination changing is judged according to whether a Request-URI stored in the transfer destination information storage portion 25 and the Request-URI included in the U-Plane data coincide.

Here, when it is judged that changing of the transfer destination designation data is necessary, the transfer destination information storage portion 25 is referenced, and the transfer destination designation information is changed to the device to become the transfer destination (in this embodiment, the HGW 40) when connecting to the transmission destination via the private network N2 (S33: transfer destination changing step). And, the information specifying the mobile communication terminal 10 which is the sender is also changed to the address used when performing communication via the private network N2, referencing the terminal specification information storage portion 24 (S34). Together with this, the Request-URI used when specifying the communication equipment 50 in the mobile communication network N1 is also overwritten to information specifying the communication equipment 50 in the private network N2 (DNS overwrite processing). When DNS resolution is performed by the HGW 40, DNS overwrite processing in the base station device 20 is unnecessary. And, in the transfer destination change portion 23, after performing the above processing to transmit U-Plane data (the information transmission request) to the communication equipment 50 which is the transmission destination via the private network N2, the U-Plane data is sent to the information transmission request transmission portion 26.

In the information transmission request transmission portion 26, the transfer destination designation information included in the information transmission request sent from the transfer destination change portion 23 is referenced, and U-Plane data is transmitted to the transfer destination. In the case of the U-Plane data of this embodiment, the HGW 40 is indicated as the transfer destination designation information, and so in the information transmission request transmission portion 26 the U-Plane data is transmitted to the HGW 40 (S35: information transmission request transmission step). And, the U-Plane data (information transmission request) transmitted from the mobile communication terminal 10 is transmitted by the HGW 40 to the communication equipment 50 which is the transmission destination (S36). By this means, communication of U-Plane data is performed between the mobile communication terminal 10 and the communication equipment 50 (S37).

Figure 9:
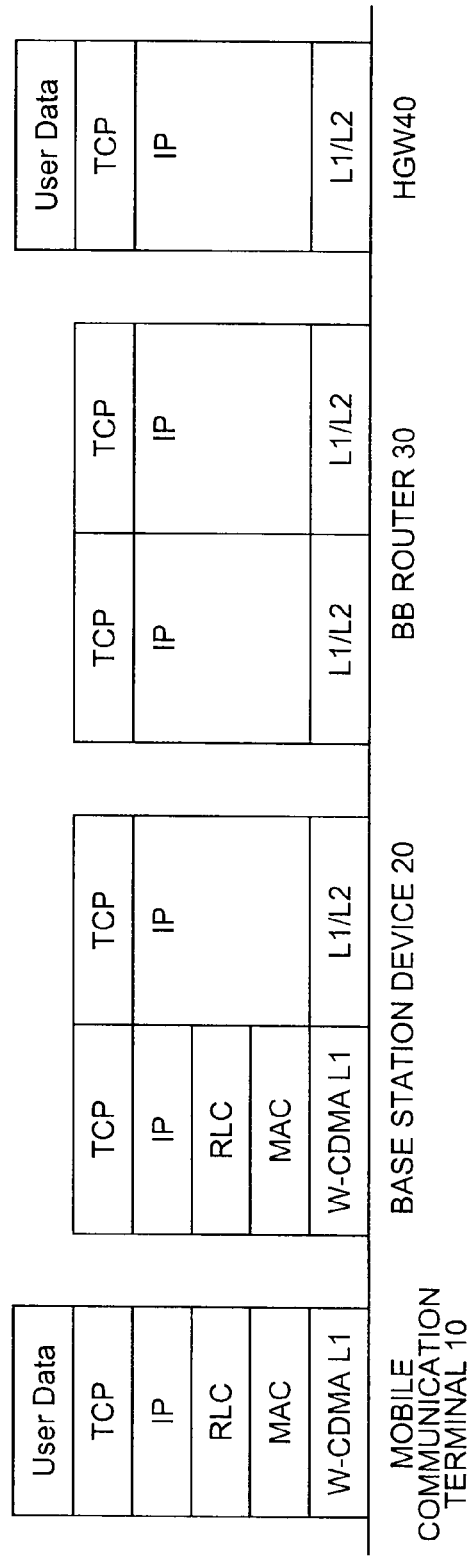
FIG. 9 shows a protocol stack in processing for transmission of U-Plane data from the mobile communication terminal 10 to the communication equipment 50 in a first embodiment of the invention.

FIG. 9 shows the protocol stack in processing for transmission of U-Plane data from the mobile communication terminal 10 shown in FIG. 6 to the communication equipment 50 at this time. In FIG. 9, from left to right are shown changes in the information transmission request transmitted from the mobile communication terminal 10. In this embodiment, the information (source address) specifying the sender stated in the IP layer of the U-Plane data in the base station device 20 changed from the address issued in the SGSN 75 to a pool address specifying the mobile communication terminal 10 in the private network N2, based on information stored in the terminal specification information storage portion 24. Further, the transfer destination designation information (destination address) stated in the IP layer of the U-Plane data is changed from information designating the WAP-GW 60 to information designating the HGW 40 (the transfer destination address shown in FIG. 4) associated with the communication equipment 50 designated by the Request-URI.

Here, although not shown in FIG. 6, when information is transmitted from the communication equipment 50 to the mobile communication terminal 10 corresponding to the U-Plane data transmitted from the mobile communication terminal 10, processing opposite the above is performed. That is, information transmitted from the communication equipment 50 to the mobile communication terminal 10 is transmitted from the communication equipment 50 to the HGW 40 via the private network N2, and is then transmitted via the BB router 30 to the base station device 20. And, in the base station device 20, after overwriting the sender address (pool address) of the mobile communication terminal 10 and transfer destination designation information (information designating the HGW 40) to the sender address (the sender address issued in the GGSN 80) and the transfer destination designation information (information designated by the WAP-GW 60) stipulated by the communication path created in advance, the information is transmitted to the mobile communication terminal 10. By this means, in the mobile communication terminal 10 the transmission of information from the communication equipment 50 via a communication path created in advance can be recognized, and the information can be handled similarly to the case of communication via a normal communication path.

In judgment of the necessity of transfer destination changing (S32) in the base station device 20, when the Request-URI included in the U-Plane data does not coincide with a Request-URI stored in the transfer destination information storage portion 25, the equipment specified by the Request-URI included in the U-Plane data is inferred to not be included in the private network N2. Hence in the transfer destination change portion 23 of the base station device 20, changing of the transfer destination of the U-Plane data is judged to be unnecessary, processing for changing of the transfer destination designation information is not performed, and the U-Plane data is transmitted to the information transmission request transition portion 26. And, the U-Plane data is transmitted by the information transmission request transmission portion 26 to the transfer destination (WAP-GW 60) designated by the transfer destination designation information included in the U-Plane data.

By means of the communication control method of this embodiment, the Request-URI (information specifying the transmission destination) included in the U-Plane data (information transmission request) is referenced in the base station device 20, and when the communication equipment 50 specified by the Request-URI is connected to the private network N2, the transfer destination designation information specifying the transfer destination is overwritten from the WAP-GW 60 to the HGW 40, and the U-Plane data is transferred to the HGW 40 which is the changed transfer destination. Hence the U-Plane data transmitted from the base station device 20 is transferred from the BB router 30 to the HGW 40 without passing through the mobile communication network N1, and is then transmitted to the communication equipment 50.

On the other hand, in the case of a conventional communication control method, communication is performed via a communication path, created in advance by the terminal connection system 3, which has the WAP-GW 60 as a transfer destination. That is, transfer is performed to the transfer destination indicated by the U-Plane data (information transmission request), without referencing the Request-URI included in the U-Plane data in the base station device 20. In a conventional communication control method, when an information transmission request is transmitted from a mobile communication terminal 10 to communication equipment 50, the information transmission request transferred from the base station device 20 is transferred to a WAP-GW 60 via a communication path included in a mobile communication network N1 which passes through a BB router 30, line terminal device 65, RNC 70, SGSN 75, and GGSN 80. And, after passing through the GGSN 80, SGSN 75, RNC 70, line terminal device 65, and BB router 30, the information is transmitted to the communication equipment 50 via the HGW 40 included in the private network N2.

In this way, in the communication control method of this embodiment, when communication equipment 50 to become a transmission destination is connected via a private network N2 to a communication control system 2 comprising a base station device 20 and BB router 30, information can be transmitted to the communication equipment 50 following a path which is shorter, compared with a communication control method with communication via a conventional communication path, by the amount of not passing through a mobile communication network N1. Hence information can be transmitted from the mobile communication terminal 10 to the communication equipment 50 with reduced traffic.

Further, connection to the communication equipment 50 included in the private network N2 is possible without passing through the mobile communication network N1, as described above, so that for a user handling the mobile communication terminal 10, fees generated by connecting to and communicating with the mobile communication network N1 can be reduced, so that inexpensive packet communication can be performed.

And, in the above communication control method, the base station device 20 ascertains whether the communication equipment 50 to become the transmission destination is connected via the private network N2. Hence processing in the mobile communication terminal 10 can be performed similarly to communication via a normal communication path, and special processing is not necessary. Hence the above communication control method can be realized solely through changing of processing in the base station device 20.

Also, as in this embodiment, when likewise connecting to communication equipment 50 included in a private network N2 constructed in a user's home from a mobile communication terminal 10 located in an area subordinate to a base station device 20 within the user's home, communication can be performed without passing through the mobile communication network N1. Hence for an enterprise managing the mobile communication network N1, communication passing through the mobile communication network N1 is reduced, so that there is the advantageous result that the processing load in the mobile communication network N1 is alleviated.

Further, by having the base station device 20 comprise a transfer destination information storage portion 25, and by ascertaining in advance at the communication control system 2 the Request-URI specifying the communication equipment 50 which can be connected from the communication control system 2 via the private network N2 and information specifying the device to become a transfer destination to be used when connecting to the communication equipment 50 via the private network N2, changing of transfer destination designation information can be performed efficiently, and a communication control method with reduced traffic can be realized more effectively.

And, by having the base station device 20 comprise a terminal specification information storage portion 24, by holding information specifying the mobile communication terminal 10 when connecting from the communication control system 2 to the communication equipment 50 via the private network N2, and by changing the information specifying the mobile communication terminal 10 based on this information, processing to transmit and receive information between the mobile communication network N1 and a network different from the private network N2 (DNS name resolution) can be performed by the base station device 20. Hence preliminary processing to perform communication from the mobile communication terminal 10 via the private network N2 can be performed by the base station device 20.

(Second Embodiment)

Next, a second embodiment of a communication control method of the invention is explained. The basic configuration of the communication system in the second embodiment is the same as the communication system 1 of the first embodiment. A difference between the second embodiment and the first embodiment is as follows. That is, when a communication path creation request designating a specific APN is transmitted by a mobile communication terminal 10, a communication path is created with a specific device as transfer destination by communication path creation means comprising an SGSN 75 and GGSN 80 included in the terminal connection system 3 (communication path creation device). Here, a specific device, when designated as the transfer destination of an information transmission request transmitted from the mobile communication terminal 10, is the device to become the transfer destination included in the private network N2 (that is, the HGW 40) to which the transfer destination is changed. And, a difference is that, when the mobile communication terminal 10 transmits an information transmission request to the base station device 20 via this communication path, transfer destination designation information is overwritten without referencing the address (Request-URI) of the transmission destination in the base station device 20. Below, the communication control method of the second embodiment is explained using FIG. 7 and FIG. 8.

Figure 7:
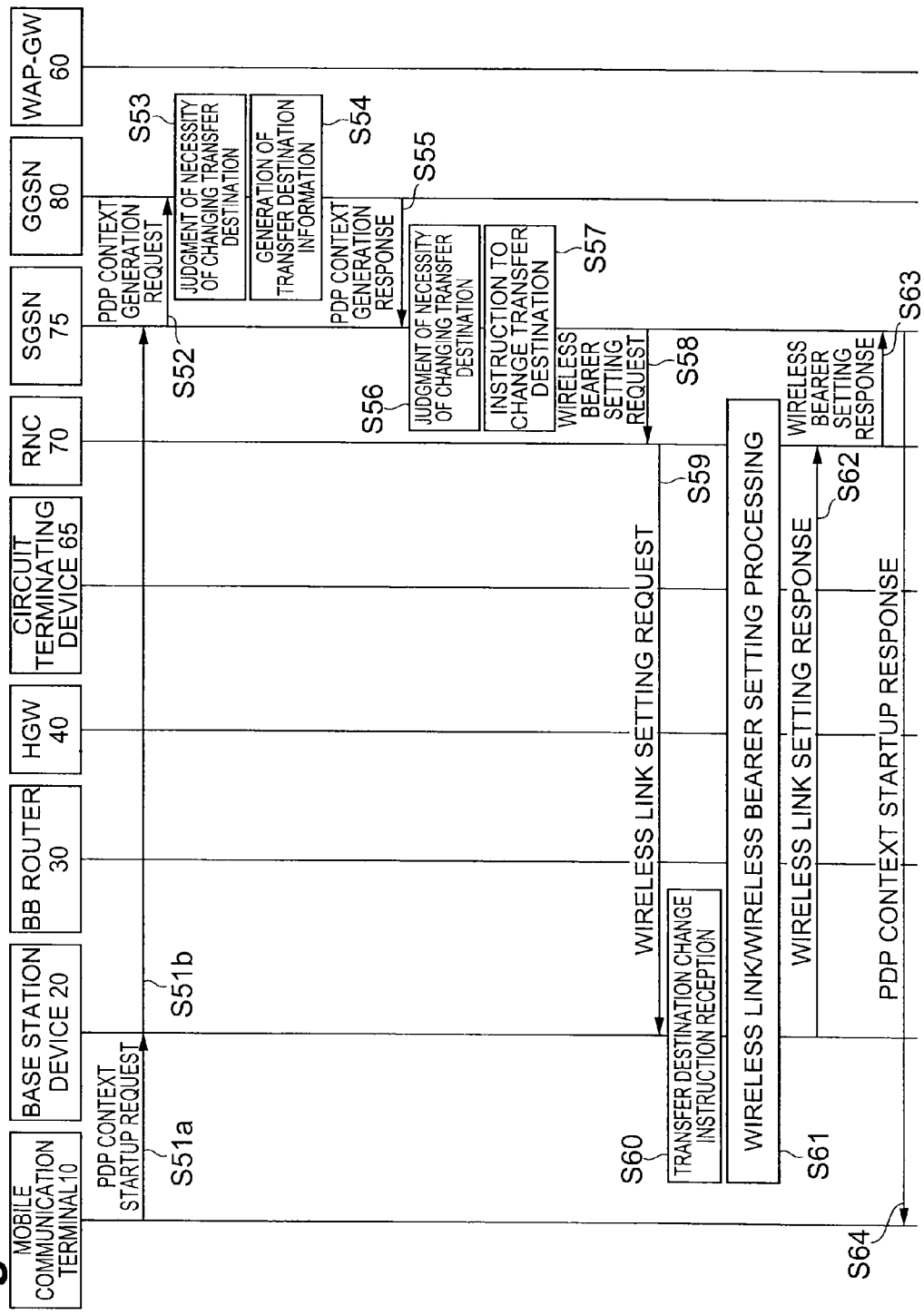
FIG. 7 explains the processing, in the communication control method of a second embodiment of the invention, up to establishment of a communication path so that a mobile communication terminal 10 performs perform packet communication.

First, FIG. 7 is used to explain processing when a communication path is connected for a mobile communication terminal 10 to perform communication via a mobile communication network N1, based on a communication path creation request transmitted from the mobile communication terminal 10.

First, a PDP (Packet Data Protocol) context startup request is transmitted from the mobile communication terminal 10 to the SGSN 75 comprised by the terminal connection system 3. Here, as the APN designating the transmission destination included in the PDP context startup request transmitted from the mobile communication terminal 10, for example information for a connection destination to perform communication only with the private network N2, or similar may be used. The PDP context startup request transmitted from the mobile communication terminal 10 is received in the communication request transfer portion 21 of the base station device 20 (S51a: communication path creation request transfer step), and is transmitted to the SGSN 75 (S51b: communication path creation request transfer step). At this time, in the communication control method of this embodiment, information specifying the base station device 20 is also transmitted to the SGSN 75.

In the SGSN 75, based on the PDP context startup request transmitted from the communication request transfer portion 21 of the base station device 20, a PDP context generation request, including the MSISDN of the mobile communication terminal 10, information specifying the base station device 20, and information specifying the SGSN 75 (the address of the SGSN 75), is transmitted to the GGSN 80 (S52).

In the communication control method of this embodiment, when a specific communication path (communication path in which the transfer destination designation information is changed when communicating via the private network N2) is opened, a table is stored in the GGSN 80 associating an APN, information specifying the mobile communication terminal 10, and information specifying the base station device 20. And, the PDP context generation request transmitted from the SGSN 75 is referenced, and a judgment is made as to whether to open the specific communication path performing transfer destination changing according to whether the APN, information specifying the mobile communication terminal 10 (MSISDN), and information specifying the base station device 20, included in the PDP context generation request, coincides with the table, stored in the GGSN 80, associating the APN and information specifying the mobile communication terminal 10, and the base station device 20 (S53). And, when there is coincidence with the association table stored in the GGSN 80, information specifying the device to become a transfer destination for transmission to the mobile communication terminal 10 (information indicating the above-described specific transfer destination) and a sender address at the time of a PDP context startup response are generated (S54). Here, the information generated specifying a device to become a transfer destination need not be information specifying the WAP-GW 60 used as the transfer destination when connecting to the mobile communication network N1 and communicating with the communication equipment 50, but may be information designating a dummy device. Hence the fact that there is no need to perform processing for acquisition of a gateway address with the WAP-GW 60 during this processing is a difference from the first embodiment. Further, dummy information can similarly be used for the sender address.

Next, as the PDP context generation response, the GGSN 80 notifies the SGSN 75 of the transfer destination designation information created in the above processing (S55). Upon receiving the PDP context generation response, the SGSN 75 references the transfer destination designation information and APN included in the PDP context generation response, and judges whether it is necessary to issue a transfer destination changing instruction to the base station device 20 (S56). As the method of this judgment, for example, a method may be employed in which the SGSN 75 ascertains in advance that when the transfer destination designation information is information designating the above-described specific device, changing of the transfer destination is necessary, and a judgment is made as to whether this corresponds to a case in which the transfer destination of transfer destination designation information transmitted from the GGSN 80 must be changed.

In the SGSN 75, when it is judged that transfer destination changing is necessary, an instruction is issued to the base station device 20 (a transfer destination changing instruction) to change the transfer destination designation information generated by the GGSN 80 and, when the above-described specific transfer destination is generated in the information transmission request transmitted from the mobile communication terminal 10, to change the transfer destination designation information to a different transfer destination (in this embodiment, the HGW 40) (S57). And, a wireless bearer setting request is issued to the RNC 70 to create a communication path (S58). The transfer destination changing instruction issued to the base station device 20 is transmitted to the RNC 70 together with the wireless bearer setting request. The RNC 70 issues a wireless link setting request to the base station device 20 based on the wireless bearer setting request transmitted from the SGSN 75 (S59). And, in the base station device 20, the transfer destination changing instruction from the SGSN 75 included in the wireless bearer setting request is received (S60), and transfer destination designation information generated by the GGSN 80 and included in the transfer destination changing instruction, and information specifying the changed transfer destination (HGW 40) when the above-described specific transfer destination is transmitted in an information transmission request, are held. And, when an information transmission request including the transfer destination designation information generated by the GGSN 80 is transmitted on the occasion of reception of this transfer destination changing instruction, processing to overwrite the transfer destination designation information to the HGW 40 is started.

Next, by performing communication between the BB router 30, HGW 40, circuit terminating device 65 and RNC 70, wireless link and wireless bearer setting processing is performed according to the wireless link setting request and transfer destination changing instruction (S61). Thereafter, the base station device 20 issues a notification to the RNC 70, as a wireless link setting response, indicating that settings could be made for connection of the mobile communication terminal 10 to the mobile communication network N1 via the base station device 20 (S62). Based on the wireless link setting response notification from the base station device 20, the RNC 70 issues a wireless bearer setting response to the SGSN 75, and issues notification that processing for packet communication has been performed (S63). The SGSN 75 issues notification to the mobile communication terminal 10, as a PDP context startup response, of the fact that communication path creation processing (PDP context startup) for the mobile communication terminal 10 has been completed through the above processing (S64). At this time, the mobile communication terminal 10 is notified of the sender address used when performing packet communication and information designating a specific transfer destination (transfer destination designation information generated by the GGSN 80). Through the above series of processing, the communication path used by the mobile communication terminal 10 to perform communication via the mobile communication network N1 is created.

Figure 8:
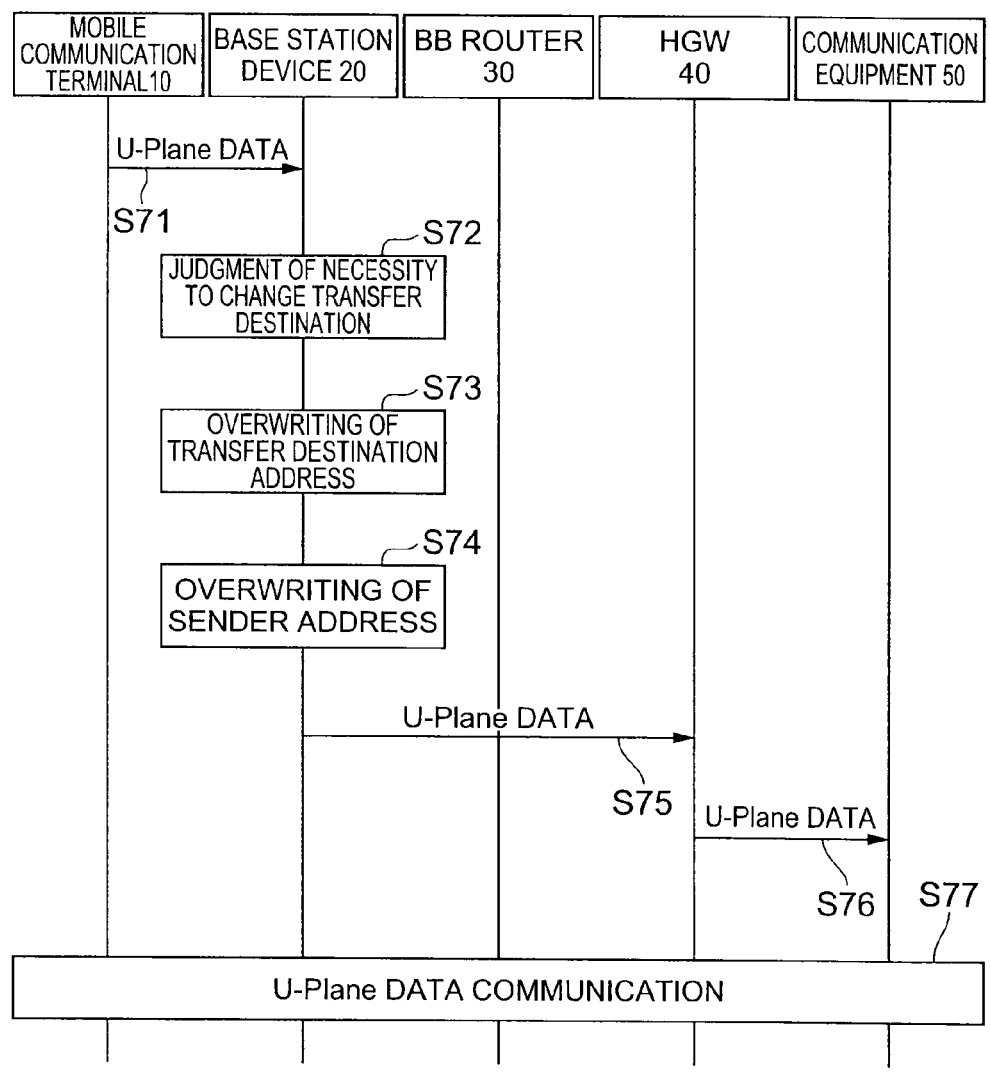
FIG. 8 explains the processing, in the communication control method of the second embodiment of the invention, up to transmission to communication equipment of an information transmission request transmitted from the mobile communication terminal 10.

Next, FIG. 8 is used to explain processing when performing communication via the communication path created by the processing shown in FIG. 7.

The mobile communication terminal 10 transmits U-Plane data (an information transmission request) to the base station device 20 (S71). Here, U-Plane data transmitted from the mobile communication terminal 10 includes information specifying the mobile communication terminal 10 (a sender address), information indicating a transmission source (a Request-URI), and transfer destination designation information (transfer destination designation information generated by the GGSN 80).

In the information transmission request reception portion 22 of the base station device 20, U-Plane data transmitted from the mobile communication terminal 10 is received (information transmission request reception step), and is sent to the transfer destination designation information change portion 23. In the transfer destination designation information change portion 23, the transfer destination designation information included in the U-Plane data sent from the information transition request reception portion 22 is referenced, and the necessity of transfer destination changing is judged according to whether there is coincidence with the transfer destination designation information generated in advance by the GGSN 80 (S72). When the transfer destination designation information coincides with the information generated by the GGSN 80, the transfer destination designation information is changed to a device (HGW 40) to become a transfer destination when performing communication via the private network N2 according to the transfer destination changing instruction transmitted from the SGSN 75 (S73: transfer destination changing step). And, information specifying the mobile communication terminal 10 which is the sender is also changed to an address used when performing communication via the private network N2, referencing the terminal specification information storage portion 24 (S74). And similarly to the processing of the first embodiment, the Request-URI used when specifying the communication equipment 50 in the mobile communication network N1 is also overwritten to information specifying the communication equipment 50 in the private network N2 as necessary (DNS overwrite processing). In the transfer destination change portion 23, after performing the above processing to transmit U-Plane data (information transmission request) to the communication equipment 50 which is the transmission destination via the private network N2, the U-Plane data is sent to the information transmission request transmission portion 26.

In the information transmission request transmission portion 26, transfer destination designation information included in the information transmission request sent from the transfer destination change portion 23 is referenced, and U-Plane data is transmitted to the transfer destination. In the case of the U-Plane data of this embodiment, because the HGW 40 is indicates as the transfer destination designation information, in the information transmission request transmission portion 26 this U-Plane data is transmitted to the HGW 40 via the BB router 30 (S75: information transmission request transmission step). Further, the U-Plane data (information transmission request) transmitted from the mobile communication terminal 10 is transmitted by the HGW 40 to the communication equipment 50 which is the transmission destination (S76). By this means, communication of U-Plane data between the mobile communication terminal 10 and the communication equipment 50 is performed (S77).

In this way, in the communication control method of this embodiment also, transfer destination designation information is changed in a communication control system 2 including a base station device 20 to a device to become a transfer destination to communicate with communication equipment 50 via a private network N2, so that compared with conventional communication via a communication path created within a mobile communication network N1, traffic can be reduced.

Further, in the communication control method of this embodiment, based on the APN transmitted from the mobile communication terminal 10 at the time of communication path creation in the terminal connection system 3, a judgment as to whether transfer destination changing is necessary is made, and based on the result, a communication path is created designating as a transfer destination a specific connection destination, instructing changing of the transfer destination. And, by referencing only the transfer destination designation information of an information transmission request in the base station device 20, the need for changing of the transfer destination of the information transmission request transmitted from the mobile communication terminal 10 via this communication path is judged, and based on the result, the transfer destination designation information is changed to a device to become the transfer destination when connecting via the private network N2. Hence even without referencing the Request-URI, the base station device 20 can judge whether changing of transfer destination designation information is necessary by referencing only the transfer destination designation information. That is, processing for changing of transfer destination designation information, performed in the base station device 20 for an information transmission request transmitted from the mobile communication terminal 10, can be reduced.

In the above embodiment, a case was explained in which transfer destination designation information included in U-Plane data received in the information transmission request reception portion 22 of the base station device 20 is referenced, and the necessity of transfer destination changing is judged. This processing is processing performed because of the need to specify via which communication path communication is performed when a plurality of communication paths are provided between the mobile communication terminal 10 and the base station device 20. Hence when the number of communication paths provided to the mobile communication terminal 10 is one, the above processing can be omitted. For example, when the communication path provided to the mobile communication terminal 10 is a communication path designating as a transfer destination a specific connection destination instructing changing of the transfer destination as described above, in judgment of the necessity of transfer destination performed in the transfer destination change portion 23 (S72), if it can be confirmed that the information transmission request was transmitted from a mobile communication terminal 10 for which a communication path was created with a specific connection destination as the transfer destination, then it can be judged that changing of the transfer destination is necessary. Hence transfer destination changing can be performed uniformly for information transmission requests transmitted from this mobile communication terminal 10. In this case, changing of transfer destination designation information can be performed without referencing information included in information transmission requests transmitted from the mobile communication terminal 10, and processing for transfer destination changing can be further reduced.

In the above, preferred embodiments of the invention have been described; but a communication system of this invention is not limited to the above embodiments, and various modes can be assumed.

For example, in the above embodiments, a configuration was employed in which the base station device 20 comprises a transfer destination change portion 23, terminal specification information storage portion 24, transfer destination information storage portion 25, and information transmission request transmission portion 26; but a configuration may be employed in which the above functions are distributed to the BB router 30.

Further, in the above embodiments, a portion of the functions of each of the devices included in the terminal connection system 3 may be distributed to other devices. An example of distribution is explained using the second embodiment; for example, a mode may be employed in which processing which had conventionally been performed by the GGSN 80 to open a specific communication path (a communication path which changes transfer destination designation information when performing communication via the private network N2) is performed by the base station device 20. In this case, in the second embodiment, the table which associates the APN when opening a specific communication path (a communication path which changes transfer destination designation information when performing communication via the private network N2), information specifying the mobile communication terminal 10, and information specifying the base station device 20 is held in the GGSN80, and processing to judge the necessity of transfer destination changing in the GGSN 80 (S53 in FIG. 7) according to whether information included in the PDP context generation request coincides with the above table is explained; but a mode may be employed in which judgment of the necessity of transfer destination changing (judgment equivalent to S53 in FIG. 7) is performed in the SGSN 75. And, when in the SGSN 75 it is judged that transfer destination changing is necessary, by notifying the base station device 20 having a function to perform processing for opening of a specific communication path of this result, processing to open the specific communication path is performed in the base station device 20.

Further, in the above embodiments, the explanation assumed a configuration in which whether transfer destination changing is necessary is judged based on a Request-URI or APN; but other information may be used to judge whether transfer destination changing is necessary. Information which can be used in judging whether transfer destination changing is necessary includes, for example, the destination address (destination IP address), transmission destination or transfer destination port number, QoS (Quality of Service), or similar. Further, a mode may be employed in which the transfer destination is changed alone for users belonging to a specific group, for example. Information which is judgment criteria when judging the necessity of transfer destination changing may be created in advance by a manager or similar and held in the base station device 20, or may be held in the SGSN 75 and GGSN 80. The device which holds information which is judgment criteria (base station device 20, SGSN 75, GGSN 80, or similar) references the above information (destination address and similar) included in the communication path creation request (PDP context startup request) and information transmission request (U-Plane data) transmitted from the mobile communication terminal 10, and judges the necessity of transfer destination changing. When information which is judgment criteria is held in the SGSN 75 and GCSN 80, at any of the times in which communication is performed to connect a communication path between the mobile communication terminal 10, base station 20, SGSN 75 and GGSN 8 0 based on a communication path generation request from the mobile communication terminal 10, the device holding information which is judgment criteria (SGSN 75 or GGSN 80) judges the necessity of transfer destination changing based on information transmitted from another device, and by notifying the base station device 20 of this result, the base station device 20 can overwrite the transfer destination address (and when necessary the sender address) included in U-Plane data transmitted from the mobile communication terminal 10.

Further, in the above embodiments, processing is performed in the transfer destination change portion 23 of the base station device 20 to change the transfer destination designation information to the HGW 40 included in the private network N2, and simultaneously with this to change the sender address to the address when connecting to the private network N2 and performing communication; however, this processing need not necessarily be performed by the communication control system 2 including the base station device 20. When connecting to the private network N2, the sender address must be changed, and so when the above processing is not performed in the communication control system 2, this processing is performed by the HGW 40.

Also, in the above embodiments, an example was presented in which the HGW 40 is provided as a device connected not only to the mobile communication network N1, but to external networks and the private network N2; but a mode is also possible in which connection does not pass through the HGW 40, but directly from the BB router 30 of the communication control system 2 to the communication equipment 50. In this case, processing to connect to a different network (for example, the mobile communication network N1 and private network N2) which had been performed in the HGW 40 is performed by the communication control system 2 (base station device 20 or BB router 30), or by the communication equipment 50.

Further, the communication control method of the first embodiment and the communication control method of the second embodiment can be combined and used as well. For example, a communication path is created in advance, premised on changing the transfer destination in advance between the mobile communication terminal 10 and the terminal connection system 3, as in the communication control method of the second embodiment. On the other hand, in the base station device 20, a table associating equipment not connected to a private network N2 to which connection and communication is conceivable, and a device to become transfer destination when an information transmission request to this equipment is transmitted from the mobile communication terminal 10, is stored in advance in the transfer destination information storage portion 25. And, when an information transmission request is transmitted from the mobile communication terminal 10 designating as the transmission destination equipment not connected to the private network N2, premised on changing the transfer destination designation information, by referencing information stored in the transfer destination information storage portion 25, the transfer destination designation information is changed to a device to become the transfer destination when communication is performed via the mobile communication network N1 and not via the private network N2. As a result, a mode can be employed in which an information transmission request is transmitted to equipment not connected to the private network N2. In this case also, by not transmitting via the mobile communication network N1 to equipment connected to the private network N2 according to the information transmission destination, information can be transmitted over a path with reduced traffic.

Further, in the above embodiments, an example was explained in which devices used in third generation (3G) mobile unit communication systems are used as the devices and base station device 20 included in the mobile communication network N1; but this invention can also be applied to LTE (Long Term Evolution: Super 3G), which is a next-generation communication system. When applying the above embodiments to LTE, a device is used having the functions of the base station device 20 and the functions of the RNC 70 as the device equivalent to the base station device 20 (base station device: Home eNode B). Further, among SGSNs 75, a MIME (Mobility Management Entity) is used as a device having functions to control C-Plane data, and a Serving-GW (Gateway) is used as a device having functions to control U-Plane data. And, as a device equivalent to a GGSN 80, a PDN-GW (Packet Data Network-Gateway) is used.

What is claimed is:

1. A communication control system, which can be connected to a plurality of networks including a mobile communication network, and performs communication between the mobile communication network and a mobile communication terminal via the communication control system, the communication control system comprising:

communication path creation request transfer means for transferring a communication path creation request transmitted from the mobile communication terminal to create a communication path specifying a device to become a transfer destination between the mobile communication terminal and the mobile communication network;

information transmission request reception means for receiving, from the mobile communication terminal for which the communication path has been created by transferring the communication path creation request by the communication path creation request transfer means, an information transmission request, including an address of a transmission destination included in a network different from the mobile communication network and transfer destination designation information designating as the transfer destination the device to become the transfer destination;

transfer destination changing means for changing the transfer destination, designated by the transfer destination designation information included in the information transmission request received by the information transmission request reception means, to the device to become the transfer destination included in the different network; and information transmission request transmission means for transmitting the information transmission request to the transfer destination changed by the transfer destination changing means.

2. The communication control system according to claim 1, further comprising transfer destination information storage means for storing information associating an address of communication equipment included in a network different from the mobile communication network to which the communication control system can connect and the device to become the transfer destination when connection is made to the communication equipment from the communication control system via the network different from the mobile communication network; wherein the transfer destination changing means references the address of the transmission destination received by the information transmission request reception means, and, when the address coincides with the address of the communication equipment included in the network different from the mobile communication network, stored by the transfer destination information storage means, changes the transfer destination, designated by the transfer destination designation information included in the transmission request received in the transmission request reception step, to the device to become the transfer destination included in the different network.

3. The communication control system according to claim 1, wherein the transfer destination changing means changes the transfer destination, designated by the transfer destination designation information included in the information transmission request transmitted from the mobile communication terminal via a communication path, created based on the communication path creation request transmitted from the mobile communication terminal and designating a specific device as the transfer destination, and received by the information transmission request reception means, to the device to become the transfer destination included in the different network.

4. A communication system, comprising:
the communication control system according to claim 3; and
a communication path creation device provided within the mobile communication network, wherein
the communication path creation device comprises communication path creation means for receiving the communication path creation request transferred from the communication path creation request transfer means, and based on the communication path creation request, creating the communication path specifying the device to become the transfer destination between the mobile communication terminal and the mobile communication network,
the communication path creation request transfer means transmits the communication path creation request transferred from the mobile communication terminal to the communication path creation device, and
the communication path creation means creates the communication path in which the specific device serves as the device to become the transfer destination, based on the communication path creation request transmitted from the communication path creation request transfer means.

5. The communication system according to claim 4, wherein the communication path creation request transfer means transmits, to the communication path creation device, the communication path creation request transmitted from the mobile communication terminal, and the information specifying the communication control system, and
the communication path creation means creates the communication path in which the specific device serves as the transfer destination based on the communication path creation request transmitted from the communication path creation request transfer means and the information specifying the communication control system.

6. The communication system according to claim 4, wherein the communication path creation device comprises a SGSN.

7. The communication control system according to claim 1, wherein, when the transfer destination designated by the transfer destination designation information included in the information transmission request received by the information transmission request reception means is a specific device, the transfer destination changing means changes the transfer destination designated by the transfer destination designation information included in the information transmission request received by the information transmission request reception means, to the device to become the transfer destination included in the different network.

8. A communication system, comprising:
the communication control system according to claim 7; and
a communication path creation device provided within the mobile communication network, wherein
the communication path creation device comprises communication path creation means for receiving the communication path creation request transferred from the communication path creation request transfer means, and based on the communication path creation request, creating the communication path specifying the device to become the transfer destination between the mobile communication terminal and the mobile communication network,
the communication path creation request transfer means transmits the communication path creation request transferred from the mobile communication terminal to the communication path creation device, and
the communication path creation means creates the communication path in which the specific device serves as the device to become the transfer destination, based on the communication path creation request transmitted from the communication path creation request transfer means.

9. The communication system according to claim 8, wherein the communication path creation request transfer means transmits, to the communication path creation device, the communication path creation request transmitted from the mobile communication terminal, and the information specifying the communication control system, and
the communication path creation means creates the communication path in which the specific device serves as the transfer destination based on the communication path creation request transmitted from the communication path creation request transfer means and the information specifying the communication control system.

10. The communication system according to claim 9, wherein the communication path creation device comprises a SGSN.

11. The communication control system according to claim 1, further comprising terminal specification information storage means for associating information specifying the mobile communication terminal and an address specifying the mobile communication terminal in communication via the network different from the mobile communication network to which the communication control system can connect, and storing the information and the address, which are associated with each other, wherein
the transfer destination changing means references the terminal specification information storage means, and changes the information specifying the mobile communication terminal which has transmitted the information transmission request, included in the information transmission request, to the address specifying the mobile communication terminal in communication via the network different from the mobile communication network to which the communication control system can connect.

12. The communication control system according to claim 1, wherein the communication path creation request includes information designating a specific APN.

13. The communication control system according to claim 1, wherein the communication path creation request is a PDP context startup request.

14. A communication control method, performed by a communication control system which can connect to a plurality of networks including a mobile communication network, and performs communication between the mobile communication network and a mobile communication terminal via the communication control system, the method comprising:

a communication path creation request transfer step of transferring a communication path creation request transmitted from the mobile communication terminal to create a communication path specifying a device to become a transfer destination between the mobile communication terminal and the mobile communication network;

an information transmission request reception step of receiving, from the mobile communication terminal for which the communication path has been created by transferring the communication path creation request in the communication path creation request transfer step, an information transmission request, including an address of a transmission destination included in a network different from the mobile communication network and transfer destination designation information designating as the transfer destination the device to become the transfer destination;

a transfer destination changing step of changing the transfer destination, designated in the transfer destination designation information included in the information transmission request received in the information transmission request reception step, to the device to become the transfer destination included in the different network; and an information transmission request transmission step of transmitting the information transmission request to the changed transfer destination in the transfer destination changing step.

15. The communication control method according to claim 14, wherein the communication path creation request includes information designating a specific APN.

16. The communication control method according to claim 14, wherein the communication path creation request is a PDP context startup request.

\* \* \* \* \*